United States Patent Office 2,907,635
Patented Oct. 6, 1959

---

2,907,635

PROCESS FOR PRODUCING POLYMERIC PHOSPHORUS PENTOXIDE

William F. Tucker, Creve Coeur, Mo., assignor to Monsanto Chemical Company, St. Louis, Mo., a corporation of Delaware No Drawing. Application October 8, 1957
Serial No. 688,820
3 Claims. (Cl. 23—165)

This invention relates to a method for making polymeric phosphorus pentoxide—i.e., a polymeric oxide of phosphorus having the empirical formula $P_2O_5$.

Phosphorus pentoxide is known to exist in a number of crystalline and amorphous forms. The most common form is often designated as the H-form, which is a crystalline solid at room temperature, exhibiting a triple point at about 360 cm. Hg and about 420° C. The H-form of phosphorus pentoxide consists of individual $P_4O_{10}$ molecules in which each phosphorus atom is tetrahedrally bonded to four neighboring oxygen atoms. This $P_4O_{10}$ molecule is the simplest known combination of pentavalent phosphorus and oxygen and will be spoken of herein as the monomeric form of phosphorus pentoxide. Electron diffraction studies have shown that phosphorus pentoxide vapor also consists of monomeric $P_4O_{10}$ molecules.

Phosphorus pentoxide exists in two other crystalline forms, often designated as O and O′, both forms of which are made up of polymeric molecules. Polymeric phosphorus pentoxide also exists in at least two amorphous forms, designated as the beta and gamma forms. Further details of these various forms are set forth in such prior art as the "Encyclopedia of Chemical Technology," volume X, pages 483–488, Interscience Encyclopedia, Inc. (1953).

For some purposes the polymeric forms of phosphorus pentoxide are more desirable than the monomeric form. For example, the polymeric forms have a lower vapor pressure than the monomeric form, thereby making the former more convenient to deal with under elevated temperature conditions. Another advantage of at least some of the polymeric forms (particularly the O-form) is that dissolution in water takes place slowly and quietly, whereas the monomeric form dissolves only with rapid and violent evolution of noise and heat.

In the past, polymeric phosphorus pentoxide has been produced by heating the H-form of phosphorus pentoxide to an elevated temperature (for example, 400° to 500° C.) until the polymerization had been completed. Because of the relatively high vapor pressure of the H-form material, the foregoing polymerization had to be carried out at superatmospheric pressures in closed containers (for example, in autoclaves) in order to prevent loss of phosphorus pentoxide during polymerization. If the polymerization was not carried out in an enclosed vessel under pressure, as much as 50 or 60% or more of the phosphorus pentoxide was lost by evaporation.

It has now been found, however, that if the H-form phosphorus pentoxide is mixed with a substantial proportion of one or more of the above-described polymeric forms of phosphorus pentoxide (and particularly with one of the crystalline forms such as the O-form or O′-form), the polymerization can be carried out at atmospheric pressure without substantial loss of phosphorus pentoxide.

The amount of solid polymeric phosphorus pentoxide to be mixed with the H-form phosphorus pentoxide prior to polymerization thereof will depend primarily upon the desired degree of conservation of phosphorus pentoxide. For example, by using as much as four parts or more by weight of polymeric phosphorus pentoxide per part of H-form phosphorus pentoxide, the vapor losses can be substantially completely eliminated. With one part of polymeric material and three parts of H-form material, the vapor loss can be reduced to about 50%. As a general proposition, it will usually be desirable to use at least an equal portion (by weight) of polymeric phosphorus pentoxide in admixture with the H-form phosphorus pentoxide—at which proportion the vapor losses are reduced to about 40%. (It will be readily recognized, of course, that the foregoing quantitative relationships presuppose a reasonable degree of subdivision and intermixing of the polymeric and monomeric phosphorus pentoxides.)

The conversion (i.e., polymerization) temperature required to carry out the present invention will depend, among other things, upon the desired rate of conversion, but will almost always be somewhat in excess of about 300° C. In general, temperatures between about 360° C. or 370° C. and 500° C., and preferably between about 400° C. and 450° C., will be most suitable.

It will be readily apparent that the present process can be carried out either by batch or by steady state continuous process techniques. For example, the process is preferably carried out either in static beds or in moving or agitated beds heated directly by radiation, indirectly by conduction through heated walls or by any one or more of numerous other equivalent means. It can, however, be carried out by passing a heated gas over or through a mechanically-stirred bed, a tumbled bed (such as in a rotary calciner) or a fluidized bed of the mixture of solids.

We have also found that the present reaction requires catalyzation by water. However, the amount of water required (for example, as low as 0.1 wt. percent or less based on the weight of total solids) is so small that it is almost always present as a matter of course in commercial grades of phosphorus pentoxide. Consequently, the catalysis of the present process is generally of little practical concern.

The following example will serve to illustrate and to describe further details of carrying out the process as well as the unique benefits resulting therefrom.

*Example*

A sample of solid crystalline H-form phosphorus pentoxide (mositure content 0.2–0.3 wt. percent) was placed in the lower end of a vertically-positioned glass tube, the upper end of which was vented to the atmosphere through a calcium chloride drying trap. A porous glass wool plug was placed in the tube just above the solid phosphorus pentoxide in order to restrain the solids in the bottom of the tube, but allow passage of vapor therethrough into the upper portion of the tube. The lower end of the glass tube was then immersed in a lead bath held at a temperature between 400° and 410° C., the tube being positioned so that the portion thereof above the glass wool plug was exposed to room temperature. It was found that by the time the solids in the lower end of the tube had reached the temperature of the lead bath, approximately 66% of the phosphorus pentoxide had been vaporized and recondensed as H-form phosphorus pentoxide in the upper end of the tube. Phosphorus pentoxide remaining in the lower end of the tube had been converted to polymeric phosphorus pentoxide.

The same procedure was duplicated except that this time the solids placed in the lower end of the tube consisted of a finely-divided (−240 mesh) intimate mechanical mixture of four parts by weight of polymeric O-form phosphorus pentoxide and one part by weight of monomeric H-form phosphorus pentoxide. In this case, all of the H-form phosphorus pentoxide was polymerized to the O-form with no loss of vapor.

In order to demonstrate that the preceding result was not merely a function of the effect of diluting the H-form phosphorus pentoxide, the same procedure was duplicated utilizing a physical admixture consisting of 4 parts by weight of sand and 1 part by weight of H-form phosphorus pentoxide. In this case, approximately 70% of the phosphorus pentoxide was vaporized and recondensed as the H-form, and only about 30% was polymerized to the O-form of phosphorus pentoxide.

What is claimed is:

1. A method of making polymeric phosphorus pentoxide from solid H-form phosphorus pentoxide, which method comprises heating said H-form in a solid mixture with at least an equal weight of solid polymeric phosphorus pentoxide at a temperature of at least 300° C. at atmospheric pressure.

2. A method of making a crystalline polymeric phosphorus pentoxide from solid H-form phosphorus pentoxide, which method comprises heating said H-form in a solid mixture with at least 4 parts by weight of solid crystalline polymeric phosphorus pentoxide at a temperature of at least 350° C. at atmospheric pressure.

3. A method of making polymeric crystalline O-form phosphorus pentoxide from solid H-form phosphorus pentoxide, which method comprises heating said H-form in a solid mixture with at least 4 parts by weight of solid crystalline O-form polymeric phosphorus pentoxide at a temperature between about 400° C. and about 450° C. at atmospheric pressure.

References Cited in the file of this patent

Encyclopedia of Chemical Technology, vol. 10, pages 483–488, Interscience Encyclopedia Inc. (1953).

Journal of American Chemical Society, Polymorphism of Phosphoric Oxide, Hill et al., vol. 65, May 1943, pages 794–802.